(12) United States Patent
Komaba (10) Patent No.: US 11,020,674 B2
(45) Date of Patent: Jun. 1, 2021

(54) PROGRAM, INFORMATION PROCESSING DEVICE, AND CONTROL METHOD FOR STRATEGIC OPERATION OF A GAME USING AN ACTION POINT SYSTEM

(71) Applicant: GREE, Inc., Tokyo (JP)

(72) Inventor: Yuya Komaba, Tokyo (JP)

(73) Assignee: GREE, Inc., Tokyo (JP)

(*) Notice: Subject to any disclaimer, the term of this patent is extended or adjusted under 35 U.S.C. 154(b) by 167 days.

(21) Appl. No.: 16/044,944

(22) Filed: Jul. 25, 2018

(65) Prior Publication Data

US 2019/0030439 A1 Jan. 31, 2019

(30) Foreign Application Priority Data

Jul. 31, 2017 (JP) .............................. JP2017-148340

(51) Int. Cl.
| | |
|---|---|
| *A63F 13/58* | (2014.01) |
| *A63F 13/533* | (2014.01) |
| *A63F 13/822* | (2014.01) |
| *A63F 13/35* | (2014.01) |
| *A63F 13/48* | (2014.01) |

(52) U.S. Cl.
CPC .......... *A63F 13/822* (2014.09); *A63F 13/35* (2014.09); *A63F 13/48* (2014.09); *A63F 13/533* (2014.09); *A63F 13/58* (2014.09)

(58) Field of Classification Search
None
See application file for complete search history.

(56) References Cited

U.S. PATENT DOCUMENTS

2010/0120495 A1* 5/2010 Frank .................. G07F 17/3211
463/20
2015/0371498 A1* 12/2015 Snow .................. G07F 17/3244
463/12

FOREIGN PATENT DOCUMENTS

| JP | 2009-39224 A | 2/2009 |
|---|---|---|
| JP | 5678146 B2 | 2/2015 |

OTHER PUBLICATIONS

Office Action dated Jan. 26, 2021 in corresponding Japanese application No. 2017-148340; 5 pgs.

* cited by examiner

*Primary Examiner* — Robert T Clarke, Jr.
(74) *Attorney, Agent, or Firm* — Maier & Maier, PLLC (57) ABSTRACT

An information processing device running a game program which improves the strategic characteristics of a game in which one or more players participate. The device may perform a step of initiating a game part in which one or more players participate; a step of providing an action opportunity to each of the one or more players; a determination step of determining a first parameter and a second parameter so that a total value of the first parameter and the second parameter which are correlated with the player becomes constant at a predetermined value when the action opportunity is given to the player; and a step of executing action processing of the player. The first parameter may be used in processing when a subsequent action opportunity is given to the player. The second parameter may be used in processing before the subsequent action opportunity is given to the player.

8 Claims, 7 Drawing Sheets

FIG.2

| REGION ID | BELONGING GROUP | SOUNDNESS | STATIONING GAME MEDIUM ID |
|---|---|---|---|
| * * * | * * * | * * * | * * * |

FIG.3

| GAME CONTENT ID | BELONGING GROUP | SOUNDNESS |
|---|---|---|
| * * * | * * * | * * * |

PROGRAM, INFORMATION PROCESSING DEVICE, AND CONTROL METHOD FOR STRATEGIC OPERATION OF A GAME USING AN ACTION POINT SYSTEM

FIELD

The present disclosure relates to a program, information processing device, and a control method.

BACKGROUND

In the related art, a game in which one or more players such as a user and an artificial intelligence (AI) participate is known. For example, Patent Literature 1 discloses a battle game in which action opportunities are given in turns to a plurality of players who respectively operate characters.

[Patent Literature 1], cited above, is Japanese Patent No. 5678146.

SUMMARY

In the related art, in a game in which one or more players participate, it may be desired to improve one or more strategic characteristics of the game.

The present disclosure has been made in consideration of the above-described situation, and an object thereof is to provide a program, an information processing device, and a control method which may improve a strategic characteristic of a game in which one or more players participate.

According to an exemplary embodiment, there may be provided a program that allows an information processing device to execute: a step of initiating a game part in which one or more players participate; a step of providing an action opportunity to each of the one or more players; a determination step of determining a first parameter and a second parameter so that a total value of the first parameter and the second parameter which may be correlated with the player becomes constant at a predetermined value when the action opportunity is given to the player; and a step of executing action processing of the player. The first parameter may be used in processing when a subsequent action opportunity is given to the player, and the second parameter may be used in processing before the subsequent action opportunity is given to the player.

According to another exemplary embodiment, there may be provided an information processing device including a control unit. The control unit may initiate a game part in which one or more players participate, may provide an action opportunity to each of the one or more players, may determine a first parameter and a second parameter so that a total value of the first parameter and the second parameter which may be correlated with the player becomes constant at a predetermined value when the action opportunity is given to the player, and may execute action processing of the player. The first parameter may be used in processing when a subsequent action opportunity is given to the player, and the second parameter may be used in processing before the subsequent action opportunity is given to the player.

According to still another exemplary embodiment, a control method may be provided for an information processing device. The method may include: a step of initiating a game part in which one or more players may participate; a step of providing an action opportunity to each of the one or more players; a determination step of determining a first parameter and a second parameter so that a total value of the first parameter and the second parameter which are corre- lated with the player may become constant at a predetermined value when the action opportunity is given to the player; and a step of executing action processing of the player. The first parameter may be used in processing when a subsequent action opportunity is given to the player, and the second parameter may be used in processing before the subsequent action opportunity is given to the player.

According to the described exemplary embodiments of the program, the information processing device, and the control method, a strategic characteristic of a game in which one or more players participate may be improved.

DETAILED DESCRIPTION

Hereinafter, various exemplary embodiments of a program, an information processing device, and a control method may be described.

Figure 1:
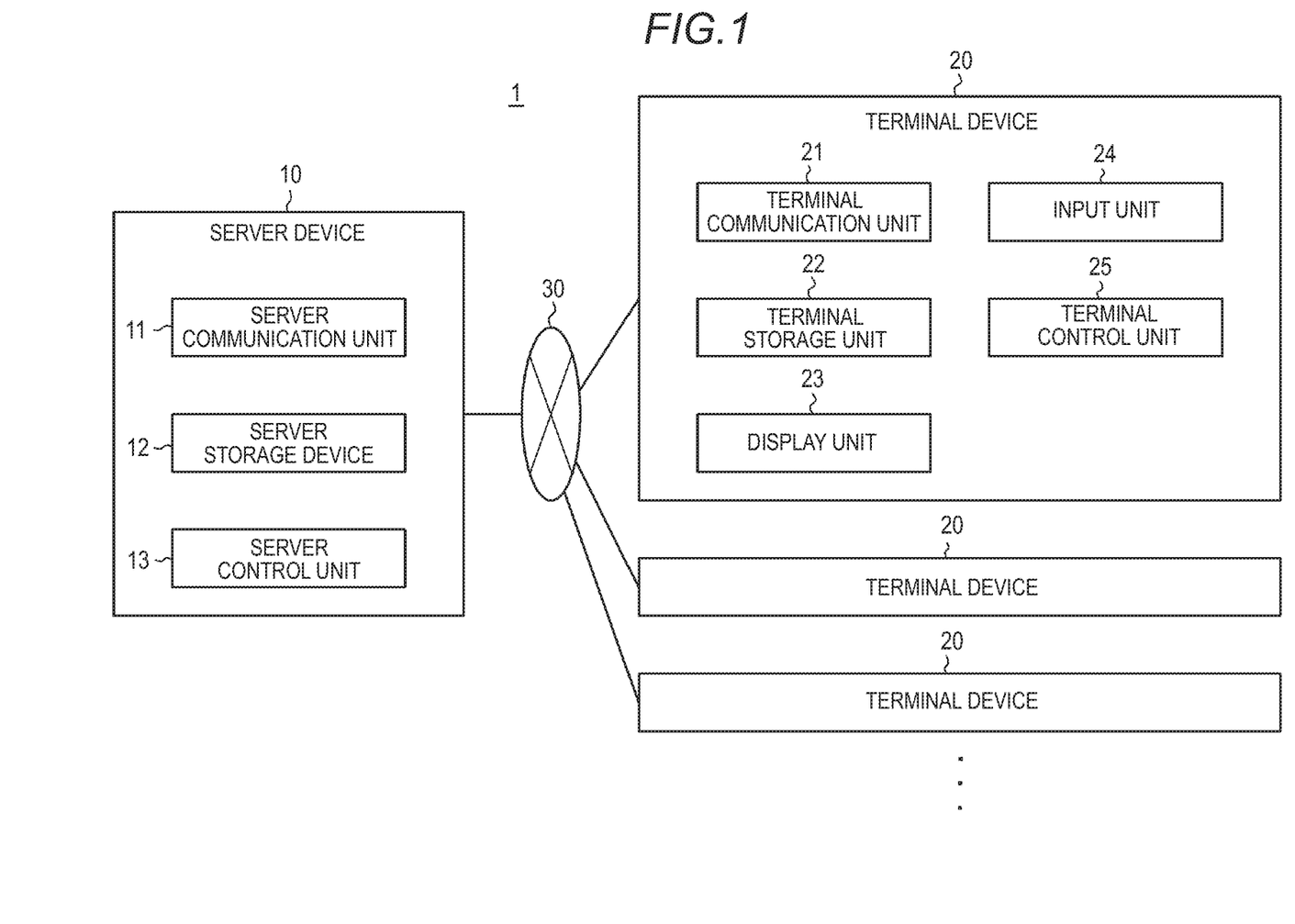
FIG. 1 is a block diagram of a game system according to an exemplary embodiment of the invention.

An exemplary embodiment of a configuration of a game system may first be discussed. Description may be given of an overview of a game system 1 according to an exemplary embodiment with reference to FIG. 1. The game system 1 may include a server device 10 and one or more terminal devices 20. In FIG. 1, three terminal devices 20 may be illustrated for convenience, but the number of terminal devices 20 may be determined in an arbitrary manner.

For example, the server device 10 may be an information processing device such as a server that may be managed by a game operator. For example, each of the terminal devices 20 may be an information processing device such as a portable phone, a smartphone, a tablet terminal, a personal computer (PC), and a game device which may be used by a user. The terminal device 20 can execute a game application according to this embodiment. For example, the game application may be received by the terminal device 20 from a predetermined application distribution server through a network 30 such as the Internet, or may be stored in advance in a storage medium such as a storage device that may be provided in the terminal device 20 or a memory card that may be readable by the terminal device 20. The server device 10 and the terminal device 20 may be connected to each other through the network 30 in such a manner as to make communication possible.

The server device 10 and the terminal device 20 may execute a plurality of kinds of processing related to a game in cooperation with each other. For example, the server device 10 and the terminal device 20 may execute a series of processing in a sharing manner. In addition, for example, the server device 10 and the terminal device 20 may execute the same process. With regard to the same processing, in a case where processing results of the server device 10 and the terminal device 20 match each other, the server device 10 and the terminal device 20 may complete the processing. On the other hand, when the processing results of the server device 10 and the terminal device 20 are different from each other, for example, the server device 10 and the terminal device 20 may complete the processing with the processing result of the server device 10 set as a correct result, or may return to a process before execution of the same processing. According to the above-described configuration, for example, even in a case where communication quality between the server device 10 and the terminal device 20 temporarily deteriorates, a possibility that the processing may be instantly stopped decreases. In addition, in the terminal device 20, for example, even in a case where unauthorized processing such as rewriting of parameters is performed, a possibility capable of rejecting the unauthorized processing may be improved.

Looking next at an exemplary embodiment of the game, description may be given of an overview of a game according to this embodiment. The game according to this embodiment may include one or more game parts. Among the one or more game parts, at least one game part may be executed by using particular game content. During execution of the game part, the game content may be operated, for example, by a user or an artificial intelligence (AI). For example, the AI may be realized by a processor that is provided in the server device 10 or the terminal device 20. Hereinafter, the user or the AI that operates the game content may each be referred to as a "player".

The game content may be electronic data that may be used in the game, and examples thereof include arbitrary media such as a card, an item, a virtual currency, a ticket, a character, an avatar, level information, status information, parameter information (a health point value, offensive power, and the like), and capability information (skill, ability, magic word, job, and the like). In addition, the game content may be electronic data that can be acquired, owned, used, managed, exchanged, composed, enhanced, sold, discarded, or donated by a user in the game, but usage aspects of the game content may not be limited to aspects stated explicitly in this specification.

Hereinafter, "a game content owned by a user" represents a game content that may be correlated with a user ID that can uniquely identify the user as being an owner of the game content unless particularly specified. In addition, "a game content may be given to a user" represents that the game content may be correlated with a user ID as an owned game content. In addition, "a game content owned by a user may be discarded" represents that correlation between a user ID and an owned game content may be canceled. In addition, "a game content owned by a user may be consumed" represents that it may be possible to cause any effect or any influence to occur in a game due to cancellation of correlation between a user ID and an owned game content. In addition, "a game content owned by a user may be sold" represents that correlation between a user ID and an owned game content may be cancelled, and another game content (for example, a virtual currency, an item, and the like) may be correlated with the user ID as an owned game content. In addition, "a game content owned by a user A may be assigned to a user B" represents that correlation between a user ID of the user A and the owned game content may be cancelled, and the game content may be correlated with a user ID of the user B as an owned game content. In addition, "a game content may be created" represents that at least a part of information related to a game content may be defined or determined.

A game part may be subject matter that can be played by a user in a game, and examples thereof include a quest, a mission, a mini game, acquisition, growth, strengthening, composition of a game content, search of a virtual space, a battle with an opponent (for example, another user, an opponent character, a building of the opponent, and the like), and the like. One or more predetermined game tasks may be set to each game part. In a case where it is determined that accomplishment of one or more game tasks set to a game part played by a user succeeds, for example, a game content and the like may be given to the user as a reward. The game tasks may be, for example, arbitrary tasks corresponding to the subject matter of the game part, and examples thereof include a task of winning in a battle with an opponent character, a task of arriving at a goal site in a virtual space, and a task in which a character of a user does not enter a predetermined state (for example, a state in which soundness (to be described later) is zero) until a predetermined time has elapsed. In addition, among one or more game tasks which are set to the game part, accomplishment of a specific game task (a completion task) may also be referred to as "completion of the game part". In a case where a user that plays the game part succeeds in accomplishment of the completion task, it may be determined that the game part has been completed, and the game part may be terminated.

One or more game parts may include a game part for single-play and a game part for multi-play. The game part for single-play may include, for example, a game part (for example, a game part for one person) that may be executed by a user operation with respect to one terminal device 20 that may be used by one user. For example, the game part for single-play may be executed by the one terminal device 20 alone or the one terminal device 20 and the server device 10 in cooperation with each other. On the other hand, for example, the game part for multi-play may include a game part (for example, a game part for multiple people) that may be executed on the basis of user operation with respect to two or more terminal device 20 which may be respectively used by two or more users and may be common to the two or more users. In the game part that may be common to two or more users, for example, at least a part of progress processing of the game part and at least a part of a processing result may include a game part that may be commonly applied to the two or more users. For example, two or more terminal devices 20 cooperate, or two or more terminal devices 20 and the server device 10 cooperate to execute the game part for multi-play. One game part may correspond to both of the single-play and the multi-play.

The game according to this embodiment may include a game part in which one or more players participate. In the game part, an action opportunity may be given to each of the one or more players. The action opportunity may include an opportunity at which action processing of a player can be executed. The action processing of the player may include arbitrary processing that may be executed on the basis of an instruction of the player. For example, the action processing of the player may include control processing of a game content that may be correlated with the player. For example, through the control processing of the game content, a character that is a game content may perform a predetermined action, or a game effect corresponding to a card that is a game content may occur.

The action opportunity may be given to a player by an arbitrary algorithm during execution of the game part. For example, in a case where the player operates a plurality of game media, the action opportunity may be given to the player for every game content.

In addition, for example, the action opportunity may be given to the player whenever a predetermined in-game time has elapsed in a predetermined game. The in-game time may be expressed by an arbitrary unit. For example, the in-game time may be expressed by a system time (for example, seconds), the number of frames in a frame rate, or the number of turns, and the like. The in-game time may be elapsed, for example, by excluding a period for which a predetermined game performance may be executed, a period for which the game is waiting on reception of a user operation, and the like during execution of the game part. For example, when an action opportunity is given to a player, an action point of the player may increase (or decrease). In this case, when the action processing of the player is executed, the action point of the player may decrease (or increase) by a value corresponding to the action processing.

In addition, for example, when the action point of a player which increases (or decreases) in correspondence with the passage of the in-game time reaches a predetermined value, the action opportunity may be given to the player. In this case, when the action processing of the player is executed, the action point of the player may decrease (or increase) by a value corresponding to the action processing.

The specific subject matter of the game part may be arbitrarily determined. In an embodiment, description may be given of a turn-based game part in which a plurality of players participate in a state of being divided into two or more groups. Schematically, in the game part, a plurality of regions may be provided in a virtual space. Each of the plurality of regions may be connected to at least one piece of another region. Each of a plurality of game media may be disposed in any one region.

A player obtains an action opportunity in a turn of the player. The player obtained the action opportunity operates, for example, one or more game media correlated with the player. Each of the game media operated by the player can execute various actions corresponding to the game content. For example, a game content that is a character can execute an action such as movement between regions connected to each other, an invasion of a region, and an attack to another game content. The player may operate the game content with the aim of acquiring a region. For example, the player may operate the game content to invade a region, and can acquire the region. When the region is acquired by the player, the region may belong to the same group as the player. The player may allow the game content to invade a territory belonging to another group. In this case, the ownership of the invaded territory may vary from another group to the same group as the game content that is operated by the player. In addition, a predetermined game termination condition may be satisfied, a determination may be made that a group having the largest value for an arbitrary index calculated on the basis of the belonging region has won a victory, and the game part may be terminated. For example, the index may include the number of regions belonging to a group, a total value of scores calculated for every region belonging to the group, and the like.

An exemplary embodiment of a configuration of the server device 10 may next be described in detail. The server device 10 may include a server communication unit 11, a server storage unit 12, and a server control unit 13.

The server communication unit 11 may include one or more interfaces which communicates with an external device in a wireless or wired manner, and transmits and receives information. For example, the server communication unit 11 may include a wireless local area network (LAN) communication module, a wired LAN communication module, and the like. The server communication unit 11 can transmit and receive information to and from the terminal device 20 through the network 30.

The server storage unit 12 may include one or more memories. For example, the memory may include a semiconductor memory, a magnetic memory, an optical memory, or the like. For example, the server storage unit 12 may function as a primary storage device or a secondary storage device. The server storage unit 12 may store information and a program that can be used in processing of a game. At least a part of the information and the program which are stored in the server storage unit 12 may be shared and synchronized with the terminal device 20. Hereinafter, an example of the information that may be stored in the server storage unit 12 may be described in detail.

Figure 2:
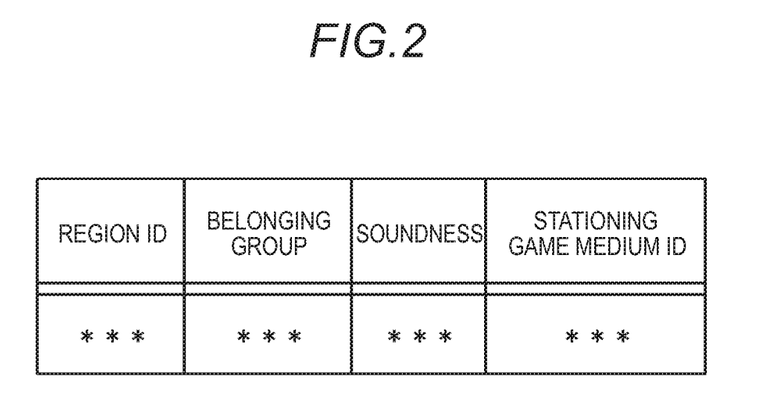
FIG. 2 is an exemplary embodiment of a view illustrating region-related information.

According to an exemplary embodiment, region information may be stored, such that the server storage unit 12 may store information related to a plurality of regions which exist in a virtual space. FIG. 2 illustrates information related to one region. The information related to the region may include "region ID", "belonging group", "soundness", and "stationing game content ID".

The "region ID" may be information that can uniquely identify a region.

The "belonging group" may be information indicating a group to which a region belongs.

The "soundness" may be a parameter that represents the degree of deterioration of the region. The soundness of the region may decrease, for example, in a case where the region is invaded by a game content. When the soundness decreases to a predetermined value (for example, zero), the region become owned by the same group as the game content that invades the region. When the pertaining group of the region varies, the soundness may be determined to a predetermined value.

The "stationing game content ID" may be a game content ID of a game content that may be located in the region.

The subject matter of the information related to the region may not be limited to the above-described example. The information related to the region may include arbitrary information that may be specific to the region. For example, the information related to the region may include the height of the region in a virtual space.

Figure 3:
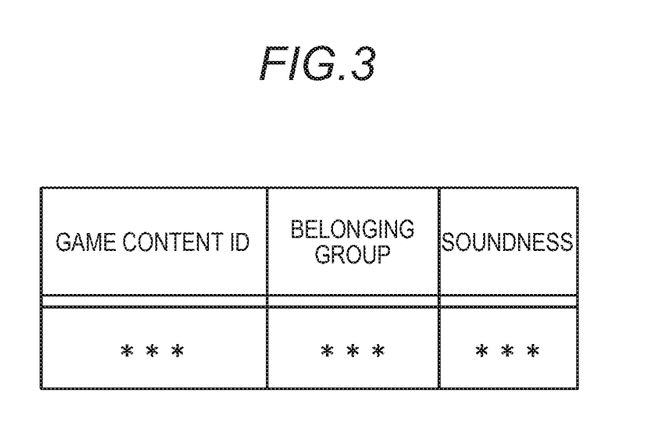
FIG. 3 is an exemplary embodiment of a view illustrating information related to an instance of game content.

Information related to an exemplary game content may next be discussed. The server storage unit 12 may store information related to a plurality of game media which can be used in a game part. For example, each of the game media may include a game content that is owned by a user. FIG. 3 illustrates information related to one game content. The information related to the game content may include a "game content ID", a "belonging group", and "soundness".

The "game content ID" may be information that can uniquely identify a game content.

The "belonging group" may be information indicating a group to which a game content belongs.

The "soundness" may be a parameter indicating the degree of deterioration of the game content. For example, the soundness of the game content may decrease in a case where the game content is attacked by another game content belonging to another group. When the soundness decreases to a predetermined value (for example, zero), arbitrary processing that may be disadvantageous for a game may be executed with respect to the game content. For example, the processing may include processing of temporarily prohibiting execution of an action by the game content, processing of temporarily erasing the game content from a virtual space, processing of reducing a score of a group to which the game content belongs, processing of fluctuating a game parameter of the game content, and the like.

Information stored in the server storage unit 12 may not be limited to the above-described example. For example, the server storage unit 12 may store an action point, a first parameter, and a second parameter in correlation with a player. The first parameter and the second parameter may be described later. Alternatively, the server storage unit 12 may store the action point, the first parameter, and the second parameter in correlation with the game content or the region. In addition, for example, the server storage unit 12 may store information related to each action that can be executed by the game content in correlation with the game content. The information related to the action may include arbitrary information and data which can be used in execution of the action.

The server control unit 13 illustrated in FIG. 1 may include one or more processors. The processors may include a general-purpose processor, and a specific processing-specific dedicated processor. The server control unit 13 may control an operation of the entirety of the server device 10. Hereinafter, an example of the operation of the server control unit 13 may be described in detail.

The server control unit 13 may store various pieces of information and various programs which can be used in the processing of a game in the server storage unit 12. The information that can be used in the processing of the game may include the information related to a region, the information related to a game content, and the like.

The server control unit 13 may perform transmission and reception of the information through the server communication unit 11. For example, the server control unit 13 may transmit at least a part of the information stored in the server storage unit 12 to the terminal device 20. In this case, the information stored in the server storage unit 12 and information stored in the terminal device 20 may be shared and synchronized. For example, a timing of performing sharing and synchronization of the information may include a timing at which new information may be stored in the server storage unit 12, and a timing at which information stored in the server storage unit 12 may be updated, but may be determined in an arbitrary manner. In addition, for example, the server control unit 13 may retrieve arbitrary information that may be input or determined in the terminal device 20 through the server communication unit 11. For example, the information may include information that may be input by a player.

The server control unit 13 may execute a game in cooperation with the terminal device 20. For example, the server control unit 13 may execute a game part in cooperation with one or more terminal devices 20. Details of the operation of the server device 10 and the terminal device 20 which may execute the game part may be described later.

An exemplary configuration of an exemplary embodiment of the terminal device 20 may be described in detail. As illustrated in FIG. 1, the terminal device 20 may include a terminal communication unit 21, a terminal storage unit 22, a display unit 23, an input unit 24, and a terminal control unit 25.

The terminal communication unit 21 may include an interface that communicates with an external device in a wireless or wired manner, and transmits and receives information. For example, the terminal communication unit 21 may include a wireless communication module corresponding to mobile communication standards such as long term evolution (LTE) (registered trademark), a wireless LAN communication module, a wired LAN communication module, and the like. The terminal communication unit 21 can transmit and receive information to and from the server device 10 through the network 30.

For example, the terminal storage unit 22 may include a semiconductor memory, a magnetic memory, an optical memory, or the like. For example, the terminal storage unit 22 may function as a primary storage device or a secondary storage device. The terminal storage unit 22 may be built-in the terminal device 20, or may be connected to the terminal device 20 through an arbitrary interface. The terminal storage unit 22 may store information and a program that can be used in processing of a game. For example, the terminal storage unit 22 may store a game application program retrieved from a predetermined application distribution server. Hereinafter, the application program may also be referred to simply as "application". The terminal storage unit 22 may store some or the entirety of the information related to a region and the information related to a game content which may be retrieved from the server device 10.

For example, the display unit 23 may include a display device such as a liquid crystal display and an organic EL display. The display unit 23 can display various screens.

For example, the input unit 24 may include an arbitrary input interface that accepts a user operation. For example, the input interface may include a pointing device such as a mouse, physical keys, a touch panel that can be provided integrally with the display unit 23, and the like.

The terminal control unit 25 may include one or more processors. The terminal control unit 25 may control an operation of the entirety of the terminal device 20. Hereinafter, an example of the operation of the terminal control unit 25 may be described in detail.

The terminal control unit 25 may perform transmission and reception of information through the terminal communication unit 21. For example, the terminal control unit 25 may retrieve information and a program which may be used in processing of a game. Specifically, the terminal control unit 25 may retrieve a game application from a predetermined application distribution server. The terminal control unit 25 may retrieve a part or the entirety of the information related to the region and the information related to the game content from the server device 10.

The terminal control unit 25 may activate the game application in correspondence with a user operation. The terminal control unit 25 may execute a game in corporation with the server device 10. For example, the terminal control unit 25 may display a screen that is used in the game on the display unit 23. For example, a plurality of graphic user interfaces (GUIs) which detect the user operation may be displayed on the screen. The terminal control unit 25 can detect the user operation with respect to the screen through the input unit 24.

An exemplary embodiment of the game processing part may next be described. The operation of an exemplary embodiment of the server device 10 and the terminal device 20 which execute the game part in cooperation with each other may be described in detail. Here, description may be given of a configuration in which the server device 10 and the terminal device 20 execute the same processing, and the server device 10 compares a processing result of the server device 10 and a processing result of the terminal device 20.

For convenience of explanation, the operation of the terminal device 20 may be described, and description of the operation of the server device 10 that may execute the same processing as in the terminal device 20 may be omitted.

The terminal control unit 25 may initiate a game part in which a plurality of players participate in a state of being divided into two or more groups. Hereinafter, description may be given of an example in which a player A may belong to a group A, and a player B may belong to a group B. Each of the players can operate one or more game media corresponding to the player. For example, the player A may be a user that may operate the terminal device 20. The player B may be an AI or a user that may operate another terminal device 20.

The terminal control unit 25 may display a screen for executing a game part on the display unit 23. Among a plurality of regions provided in a virtual space, at least a part of the regions may be displayed on the screen.

The terminal control unit 25 may provide an action opportunity to each of the players. An arbitrary algorithm may be employed in processing of providing the action opportunity. For example, the terminal control unit 25 may provide the action opportunity to a player whenever a predetermined in-game time has elapsed. The terminal control unit 25 may display a predetermined parameter that increases with the elapse of the in-game time on the screen, and when the parameter becomes a predetermined value, the action opportunity may be provided to the player.

The terminal control unit 25 may increase an action point value of the player. As an example, as may be described later, the action points of the player may be consumed due to execution of action processing of the player. A timing at which the action point of the player may be increased may be determined in an arbitrary manner. For example, when the action opportunity may be given to the player, the terminal control unit 25 may increase the action points of the player. Specifically, when the action opportunity is given to the player, the terminal control unit 25 may increase the action points of the player on the basis of the first parameter that may be determined in the previous action opportunity of the player as to be described later. For example, the greater the first parameter is, the greater the amount that the action points may increase.

When the action opportunity may be given to the player, the terminal control unit 25 may perform action processing of the player on the basis of an instruction of the player. With regard to the action processing of the player, for example, the terminal control unit 25 may cause at least one game content correlated with the player to execute an action such as movement between regions, an attack with respect to another game content, an invasion with respect to a region, and the like on the basis of an instruction of the player. The terminal control unit 25 may perform the action processing by consuming the action point of the player by a cost value corresponding to the subject matter of the action processing.

When the action opportunity is given to the player, the terminal control unit 25 may determine a first parameter and a second parameter of the player so that a total value of the first parameter and the second parameter may become constant at a predetermined value. When determining the first parameter and the second parameter, the terminal control unit 25 may fluctuate one of the first parameter and the second parameter in a range from zero to the predetermined value on the basis of an instruction of the player. The first parameter and the second parameter may be set to fluctuate in correspondence with consumption of the action points of the player. For example, the first parameter may increase, due to consumption of the action points, by a predetermined value.

The first parameter may be used in processing when the subsequent action opportunity is given to the player. For example, the processing may include the above-described processing of increasing the action points of the player. For example, the greater the first parameter is, the greater an increase amount of the action points of the player (which may increase when the subsequent action opportunity is given to the player) may be. In addition, for example, the greater the first parameter is, the greater the reduction in the cost value necessary for execution of the action processing when the subsequent action opportunity is given to the player. According to the above-described configuration, a burden on a player for executing the action processing at the current action opportunity may be enlarged, and thus it may be possible to reduce a burden on the player for executing the action processing at the subsequent action opportunity. Accordingly, it may be necessary for the player to consider trade-off between a burden on execution of the action processing at the current action opportunity and a burden on execution of the action processing at the subsequent action opportunity. Accordingly, a strategic characteristic of a game may be improved. In addition, for example, as the first parameter may be greater, a game parameter (for example, a "movement amount" parameter that contributes to determination of a movement-possible distance by action processing performed once) of a character operated by the player may fluctuate.

The second parameter may be used in processing before the subsequent action opportunity is given to the player.

For example, at least at a part of a period until the subsequent action opportunity is given to the player after the second parameter is determined in an action opportunity of the player, the terminal control unit 25 may cause a game effect of making the player closer to an advantageous or disadvantageous situation which may occur on the basis of the second parameter of the player. The game effect of making the player closer to the advantageous or disadvantageous situation may be arbitrarily determined in correspondence with the specific subject matter of a game part.

For example, the game effect of making a first player closer to the advantageous or disadvantageous situation may include a game effect of fluctuating a parameter of a game content correlated with the first player (for example, a game effect of increasing or decreasing soundness of the game content). The game effect of making the first player closer to the advantageous or disadvantageous situation may include a game effect of fluctuating a parameter of a game content correlated with a second player different from the first player (for example, a game effect of decreasing or increasing soundness of the game content). For example, the amount of fluctuation of the parameter that fluctuates due to the game effect may vary in correspondence with the second parameter correlated with the first player.

In addition, for example, the game effect of making the first player closer to the advantageous or disadvantageous situation may include a game effect of increasing or decreasing a fluctuation amount when a parameter of a game content correlated with the first player fluctuates in correspondence with a predetermined event (for example, a game effect of decreasing or increasing a decrease amount when soundness of a game content decreases), and the like. The game effect of making the first player closer to the advantageous or disadvantageous situation may include a game effect of increasing or decreasing a fluctuation amount when a parameter of a game content correlated with the second player different from the first player fluctuates in correspondence with occurrence of a predetermined event (for example, a game effect of increasing or decreasing a decrease amount when soundness of the game content decreases), and the like. For example, an increase value or a decrease value of the fluctuation amount of the parameter that may increase or decreases due to the game effect may vary in correspondence with the second parameter correlated with the first player.

According to the above-described configuration that uses the first parameter and the second parameter, a player can consider trade-off between a game effect when the subsequent action opportunity is given and a game effect before the subsequent action opportunity is given. In addition, each player can examine a strategy in consideration of a game effect when the subsequent action opportunity is given to another player, and a game effect until the subsequent action opportunity is given to the other player. In this manner, the player can examine a strategy for which a future game effect may also be considered in addition to a current game effect. Accordingly, the strategic characteristic of a game may be improved.

Figure 4:
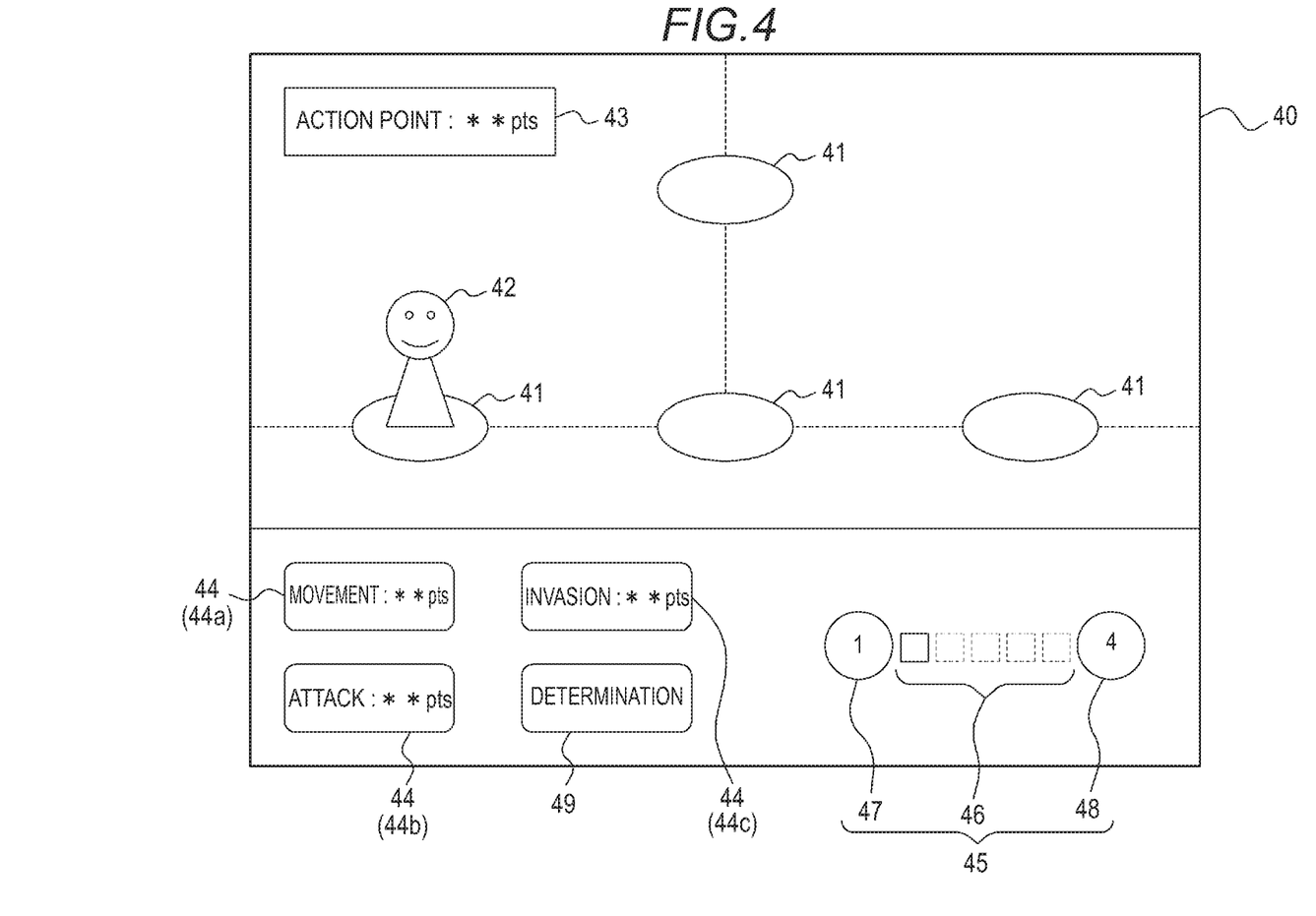
FIG. 4 is an exemplary embodiment of a view illustrating a first example of a screen that is displayed on a terminal device.

Description may be given of a screen 40 that may be displayed on the display unit 23 of the terminal device 20 during execution of the above-described game part with reference to FIG. 4. The screen 40 may be an example of a screen when an action opportunity may be given to a user of the terminal device 20 who is a player. Four regions 41, a game content 42, an action point 43, three action selection buttons 44 (44*a* to 44*c*), a parameter operation region 45, and a determination button 49 may be displayed on the screen 40.

The action selection button 44 may be a GUI that accepts a user operation for selecting an action that may be executed by the game content 42. A corresponding action and a cost value may be displayed in each of the action selection button 44. For example, an action corresponding to the action selection button 44*a* may be "movement". An action corresponding to the action selection button 44*b* may be "attack". An action corresponding to the action selection button 44*c* may be "invasion". When receiving a user operation with respect to the action selection button 44, the terminal control unit 25 selects an action corresponding to the action selection button 44.

An interface 46, a first parameter 47, and a second parameter 48 may be displayed in the parameter operation region 45. The interface 46 may be a GUI that accepts a user operation that causes the first parameter 47 and the second parameter 48 to fluctuate. In the examples illustrated in FIG. 4, the interface 46 may include five frames (for example, check boxes) which may be provided to be selected in correspondence with a user operation. The terminal control unit 25 may determine the first parameter 47 as the number of frames in selection, and may determine the second parameter 48 as the number of frames in non-section. In FIG. 4, a frame that may be in selection may be indicated by a solid-line, and frames which may be in non-section may be indicated by a broken-line. In the example illustrated in FIG. 4, the first parameter 47 may be one point, and the second parameter 48 may be four points. The terminal control unit 25 may calculate a cost value corresponding to the first parameter 47. For example, as the first parameter 47 may be greater, the cost value may be set to be greater. For example, the first parameter 47 and a cost value corresponding to the first parameter 47 may be the same value.

Hereinafter, a total value of a cost value corresponding to each action that may be in selection and a cost value corresponding to the first parameter 47 may also be referred to as "total cost". The terminal control unit 25 may receive a user operation with respect to each of the one or more action selection buttons 44 and the interface 46 in a range in which the total cost may become equal to or less than the action point 43.

The determination button 49 may be a GUI that accepts a user operation of causing a player to execute action processing of a user. In a case where the total cost exceeds the action point 43, the terminal control unit 25 may stop reception of the user operation with respect to the determination button 49. When receiving the user operation with respect to the determination button 49, the terminal control unit 25 may execute action processing of a user. Specifically, the terminal control unit 25 may reduce the total cost from the action point 43, and may cause the game content 42 to execute each action that is in selection through the action selection button 44. The terminal control unit 25 may cause the game effect of making a user closer to the advantageous or disadvantageous situation to occur on the basis of the second parameter determined through interface 46 to occur at least at a part of a period until the subsequent action opportunity may be given to the user.

After execution of action processing A of a user who is a player, when the subsequent action opportunity B is given to the user, the terminal control unit 25 may increase the action points 43 of the user on the basis of the first parameter determined through the interface 46 in the action processing A. The terminal control unit 25 may increase the action points 43 by a predetermined amount regardless of the first parameter in addition to the increase of the action points 43 based on the first parameter.

Figure 5:
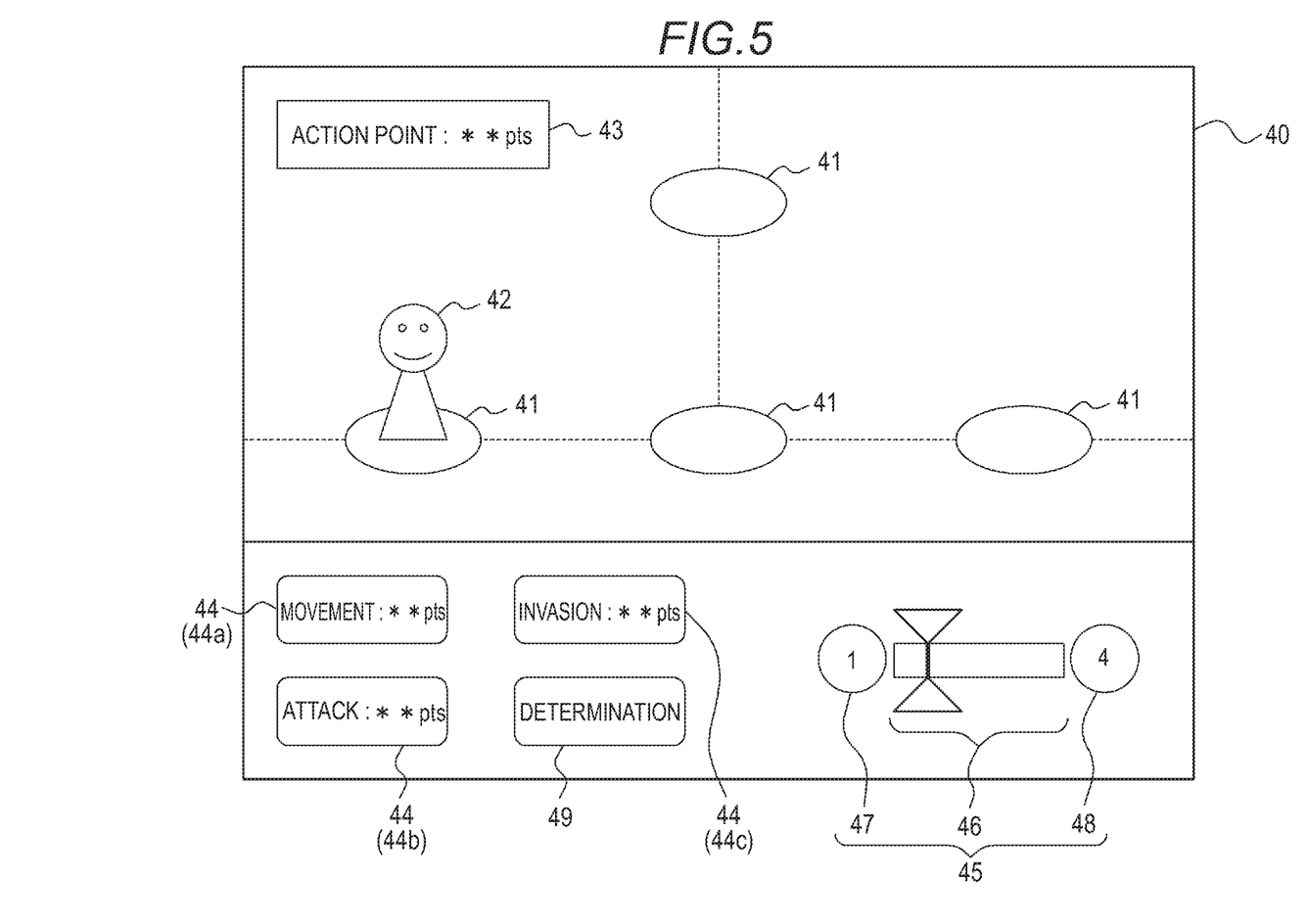
FIG. 5 is an exemplary embodiment of a view illustrating a second example of the screen that is displayed on the terminal device.

Here, a specific aspect of the interface 46 may not be limited to the above-described example. For example, in an example illustrated in FIG. 5, the interface 46 may include a slider that can move in a one-dimensional direction. For example, the terminal control unit 25 may determine the first parameter 47 and the second parameter 48 in correspondence with a position of the slider.

An example of an operation of the terminal device 20 may be described with reference to FIG. 6. The operation may include an operation of the terminal device 20 that may execute action processing of the player. The operation may be executed when an action opportunity is given to the player.

Step S100: The terminal control unit 25 may provide an action opportunity to a player.

Step S101: The terminal control unit 25 may increase an action point value that is correlated with the player on the basis of the first parameter that is determined in the previous action opportunity of the player.

Step S102: The terminal control unit 25 may determine the first parameter and second parameter so that a total value of the first parameter and the second parameter which may be correlated with the player may become constant at a predetermined value.

Step S103: The terminal control unit 25 may cause a game effect of making the player be close to an advantageous or disadvantageous situation to occur on the basis of the second parameter determined in step S102.

Step S104: The terminal control unit 25 may execute action processing of the player.

In a case where the above-described operation may be executed for the first time after initiation of the game part, step S101 and step S102 may be omitted.

As described above, when an action opportunity is given to a player, the terminal device 20 according to this embodiment may determine the first parameter and the second parameter which may be correlated with the player so that the total value of the first parameter and the second parameter may become constant at a predetermined value, and may execute the action processing of the player. Here, the first parameter may be used in processing when the subsequent action opportunity is given to the player. On the other hand, the second parameter may be used in processing before the subsequent action opportunity is given to the player. According to the above-described configuration, it may be necessary for the player to consider trade-off between a game effect by processing when the subsequent action opportunity may be given and a game effect by processing before the subsequent action opportunity may be given. Accordingly, the strategic characteristic of a game may be improved.

The various exemplary embodiments described herein have been described on the basis of various drawings and examples, but it should be understood that various modifications or changes can be easily made by those skilled in the art on the basis of the present disclosure. Accordingly, it should be understood that the medications and changes may be included in the scope of the invention. For example, functions included in respective units, respective steps, and the like, and the like can be rearranged without logical contradiction, and a plurality of units, a plurality of steps, and the like can be combined into one, or can be divided.

For example, in the above-described embodiment, a part or the entirety of the operation and the processing which may be executed by the server device 10 can be configured to be executed by the terminal device 20. Similarly, a part of the operation that may be executed by the terminal device 20 can be configured to be executed by the server device 10. For example, processing such as the display control of various screens displayed on the terminal device 20, and the control of various GUIs may be executed by one of the server device 10 and the terminal device 20, or may be cooperatively executed by the server device 10 and the terminal device 20. Alternatively, the game system 1 may not include the server device 10. In this case, the terminal device 20 may store information received from the server device 10 in the above-described embodiment in advance.

Figure 6:
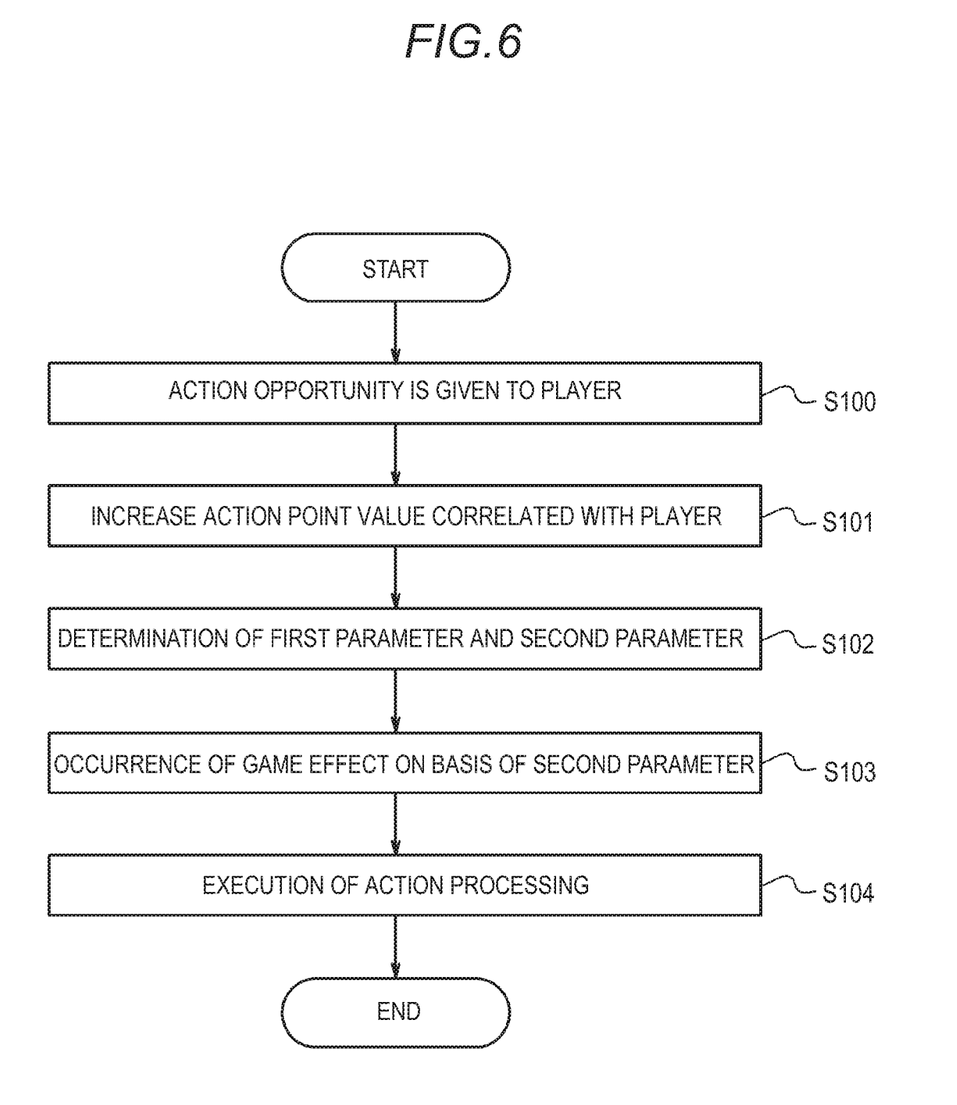
FIG. 6 is an exemplary embodiment of a flowchart illustrating an operation of the terminal device.

In addition, in the above-described embodiment, description has been given of an example of the operation of the terminal device 20 with reference to FIG. 6. However, partial steps included in an operation, or partial operations included in one step may be omitted. Sequences of a plurality of steps may be substituted with each other in a range without logical contradiction.

In addition, in the above-described embodiment, description has been given of a configuration in which the first parameter determined in a current action opportunity can be used in processing when the subsequent action opportunity may be given to a player, and the second parameter determined in the current action opportunity can be used in processing before the subsequent action opportunity may be given to the player. However, it may also be possible to employ a configuration in which the first parameter determined in the current action opportunity can be used in processing when the subsequent or later arbitrary action opportunity may be given to the player, and the second parameter determined in the current action opportunity can be used in processing before the subsequent or later arbitrary action opportunity may be given to the player.

In addition, in the above-described embodiment, the server storage unit 12 may store an attribute in correlation with a region. When a game content located in the region executes an action, a game effect that is different in correspondence with the attribute of the region may occur. For example, in a case where a game content located in a region having a first attribute attacks another game content, a damage amount that may be applied to the other game content by the attacking game content may increase. In addition, for example, in a case where a game content located in a region having a second attribute moves to another region, a cost value necessary for the movement may be reduced. In addition, for example, in correspondence with the number of game media located in a region having a third attribute, an action point value of a player that operates the game media may increase. A game effect corresponding to an attribute of a region may be determined in an arbitrary manner without limitation to the above-described example.

In addition, for example, parts of processing related to the first parameter and the second parameter, which may be correlated with a player, may be changed on the basis of the number of regions which belong to the same group as the player and which are correlated with a predetermined attribute.

Specifically, as described above, when an action opportunity may be given to a player, the terminal control unit 25 may determine the first parameter and the second parameter so that a total value of the first parameter and the second parameter of the player may become constant at a predetermined value. Here, the predetermined value may vary in correspondence with the number of regions which belong to the same group as the player and may be correlated with a predetermined attribute. For example, the greater the number of the regions is, the further the predetermined value may increase or decrease. In addition, for example, in a case where the number of the regions may be equal to or greater than a predetermined reference number, the predetermined value may increase or decrease. According to the above-described configuration, a merit or a demerit of acquiring a region correlated with the predetermined attribute may be formed, and thus the strategic characteristic of a game may be further improved.

In addition, specifically, as described above, when determining the first parameter and the second parameter, for example, the terminal control unit 25 may allow one of the first parameter and the second parameter to fluctuate in a range from zero to the predetermined value in correspondence with consumption of the action points of the player. Here, a consumption amount of the action points consumed to allow the first parameter and the second parameter to fluctuate may vary in correspondence with the number of regions which belong to the same group as the player and which may be correlated with a predetermined attribute. For example, the greater the number of the regions is, the further the consumption amount decreases or may increase. In addition, for example, in a case where the number of the region may be equal to or greater than a predetermined reference number, the consumption amount may decrease or increase. According to the above-described configuration, a merit or a demerit of acquiring a region correlated with the predetermined attribute may be formed, and thus the strategic characteristic of a game may be further improved.

In addition, specifically, as described above, in correspondence with the first parameter determined in an action opportunity given to a player, in the subsequent action opportunity of the player, the action points of the player may increase, and the cost value necessary for execution of action processing may be reduced, or a game parameter of a character operated by the player fluctuates. Here, an increase amount of the action points, a reduction amount of the cost value, or a fluctuation amount of the game parameter may vary in correspondence with the number of regions which belong to the same group as the player and may be correlated with a predetermined attribute. For example, the greater the number of the regions is, the further the increase amount of the action point, the reduction amount of the cost value, or the fluctuation amount of the game parameter may decrease or increase. In addition, for example, in a case where the number of the regions may be equal to or greater than a predetermined reference number, the increase amount of the action point, the reduction amount of the cost value, or the fluctuation amount of the game parameter may decrease or increase. According to the above-described configuration, a merit or a demerit of acquiring a region correlated with the predetermined attribute may be formed, and thus the strategic characteristic of a game may be further improved.

In addition, specifically, an effect value of a game effect that occurs on the basis of the second parameter (for example, in a game effect of causing a predetermined parameter to fluctuate, a fluctuation amount of the parameter) may vary in accordance with the number of regions which belong to the same group as the player and may be correlated with a predetermined attribute. For example, the greater the number of the regions is, the further the effect value of the game effect that occurs on the basis of the second parameter increase or decrease. According to the above-described configuration, a merit or a demerit of acquiring a region correlated with the predetermined attribute may be formed, and thus the strategic characteristics of the game may be further improved.

In addition, in the above-described embodiment, description has been given of a configuration in which the server storage unit 12 stores the action points, the first parameter, and the second parameter in correlation with each player. However, for example, it may also be possible to employ a configuration in which the server storage unit 12 stores the action points, the first parameter, and the second parameter in correspondence with each game content or each region. In this case, when the action point value reaches a predetermined value, an action opportunity may be given to a game content correlated with the action points, or a game content located in a region correlated with the action points. In addition, the terminal control unit 25 may determine the first parameter and the second parameter for every game content or game region. In addition, for every player, the terminal control unit 25 may collectively determine the first parameter and the second parameter with respect to at least two game media among the entirety of game media correlated with the player, or at least two regions among the entirety of regions belonging to the same group as the player. In this case, the terminal control unit 25 may determine a ratio of the second parameter to the first parameter, for example, in correspondence with a user operation or in an automatic manner. The terminal control unit 25 may perform control so that the ratio of the second parameter to the first parameter in each of at least the two game media or regions may become approximately the same as the ratio determined as described above. For example, detailed description may be given of a case where the ratio of the second parameter to the first parameter may be determined as 3 (that is, the first parameter:the second parameter=1:3). In this case, for example, with regard to a region A in which a total value of the first parameter and the second parameter is 16 points, the first parameter may become $16 \times \frac{1}{4}=4$ points, and the second parameter may become $16 \times \frac{3}{4}=12$ points. On the other hand, for example, with regard to a region B in which the total value of the first parameter and the second parameter may be 9 points, the first parameter may be $9 \times \frac{1}{4}=2.25 \approx 2$ points, and the second parameter may become $9 \times \frac{3}{4} \approx 6.75 \approx 7$ points. After the first parameter and the second parameter are collectively determined with respect to at least two game media or regions, the first parameter and the second parameter may be individually changed for every game content or region. According to the above-described configuration, in a configuration in which the first parameter and the second parameter may be correlated with each game content or each region, a user can collectively adjust the first parameter and the second parameter with respect to two or more game media or regions, and thus complication of a user operation may be reduced.

In addition, for example, it may be also possible to employ a configuration in which the server storage unit 12 stores an attribute in correlation with each game content or each region in addition to the action point, the first parameter, and the second parameter. In the above-described configuration, a part of processing related to the first parameter and the second parameter which may be correlated with a game content or a region may be changed on the basis of the attribute of the game content or the region.

Specifically, a total value of the first parameter and the second parameter which may be correlated with the game content or the region may be different in each case in correspondence with the attribute of the game content or the region. For example, the total value of the first parameter and the second parameter of a game content or a region which has a first attribute may be constant, for example, as 5 points. On the other hand, the total value of the first parameter and the second parameter of a game content or a region which has a second attribute may be constant, for example, as 8 points. According to the above-described configuration, a strategy different in correspondence with the attribute of the game content or the region may be possible, and thus the strategic characteristics of a game may be further improved.

In addition, specifically, the consumption amount of the action points that may be consumed to cause the first parameter and the second parameter to fluctuate may be different in correspondence with the attribute of the game content or the region. For example, the consumption amount of the action points that may be consumed to cause the first parameter and the second parameter of the game content or the region to fluctuate may be greater or smaller in a case where the attribute of the game content or the region is a first attribute in comparison to a case where the attribute is a second attribute. According to the above-described configuration, a strategy different in correspondence with the attribute of the game content or the region can be employed, and thus the strategic characteristics of a game may be further improved.

In addition, specifically, it may also be contemplated to employ a configuration in which in correspondence with a first parameter that may be determined in an action opportunity given to a game content or a game content located in a region, the action point value of the game content may increase, the cost value necessary for execution of action processing may be reduced, or a game parameter of the game content may fluctuate in the subsequent action opportunity of the game content. In the above-described configuration, an increase amount of the action points, a reduction amount of the cost value, or a fluctuation amount of the game parameter may be different in each case in correspondence with the attribute of the game content or the region. For example, the increase amount of the action point, the reduction amount of the cost value, or the fluctuation amount of the game parameter may be greater or smaller in a case where the attribute of the game content or the region is the first attribute in comparison to a case where the attribute is the second attribute. According to the above-described configuration, a strategy different in correspondence with the attribute of the game content or the region can be employed, and thus the strategic characteristics of a game may be further improved.

In addition, specifically, an effect value of a game effect that occurs on the basis of a second parameter determined in an action opportunity given to a game content or a game content located in a region may be different in correspondence with an attribute of the game content or the region. For example, the effect value of the game effect that occurs on the basis of the second parameter may be greater or smaller in a case where the attribute of the game content or the region is the first attribute in comparison to the attribute is the second attribute. According to the above-described configuration, a strategy different in correspondence with the attributes of the game content or the region can be employed, and thus the strategic characteristics of a game may be further improved.

In addition, in the above-described embodiment, description has been given of a configuration in which a region in which soundness may be reduced to a predetermined value (for example, zero) may belong to the same group as a game content that invades the region. However, an arbitrary algorithm may be employed in determination and change of the group to which a region may belong. For example, when a ratio of the number of game media belonging to one arbitrary group to the number of the entirety of game media located in a region may become equal to or greater than a predetermined value, the terminal control unit 25 may change the group that owns the region to that arbitrary group.

In addition, in the above-described embodiment, description has been given of a configuration in which the server storage unit 12 may store information related to each action that can be executed by a game content in correspondence with the game content. In another embodiment, the server storage unit 12 may store information related to each action that can be executed by a player in correspondence with the player.

In addition, in the above-described embodiment, description has been given of a turn-based game part which uses a plurality of regions provided in a virtual space and a plurality of game media. However, the specific subject matter of the game part may not be limited to the above-described example. For example, the game part according to another embodiment may be a real-time-based game part.

As a summary, the real-time-based game part according to another embodiment may include a battle game part that may be executed by using a plurality of game media which may be correlated with respective players (hereinafter, also referred to as a "deck"). For example, a cost value may be determined in each game content. During execution of the game part, the action point of each player may increase with the elapse of an in-game time. When the action points of the player reach a cost value of the game content correlated with the player, an action opportunity of operating the game content may be given to the player. A state in which the action opportunity of operating the game content may be given to the player continues as long as the action points of the player may be equal to or greater than the cost value of the game content. In a state in which the action opportunity may be given, when the player selects the game content, the cost value of the game content may be subtracted from the player's action points, and the game content appears in a virtual space. For example, the game content that appears in the virtual space automatically may execute an action such as an attack and movement.

Figure 7:
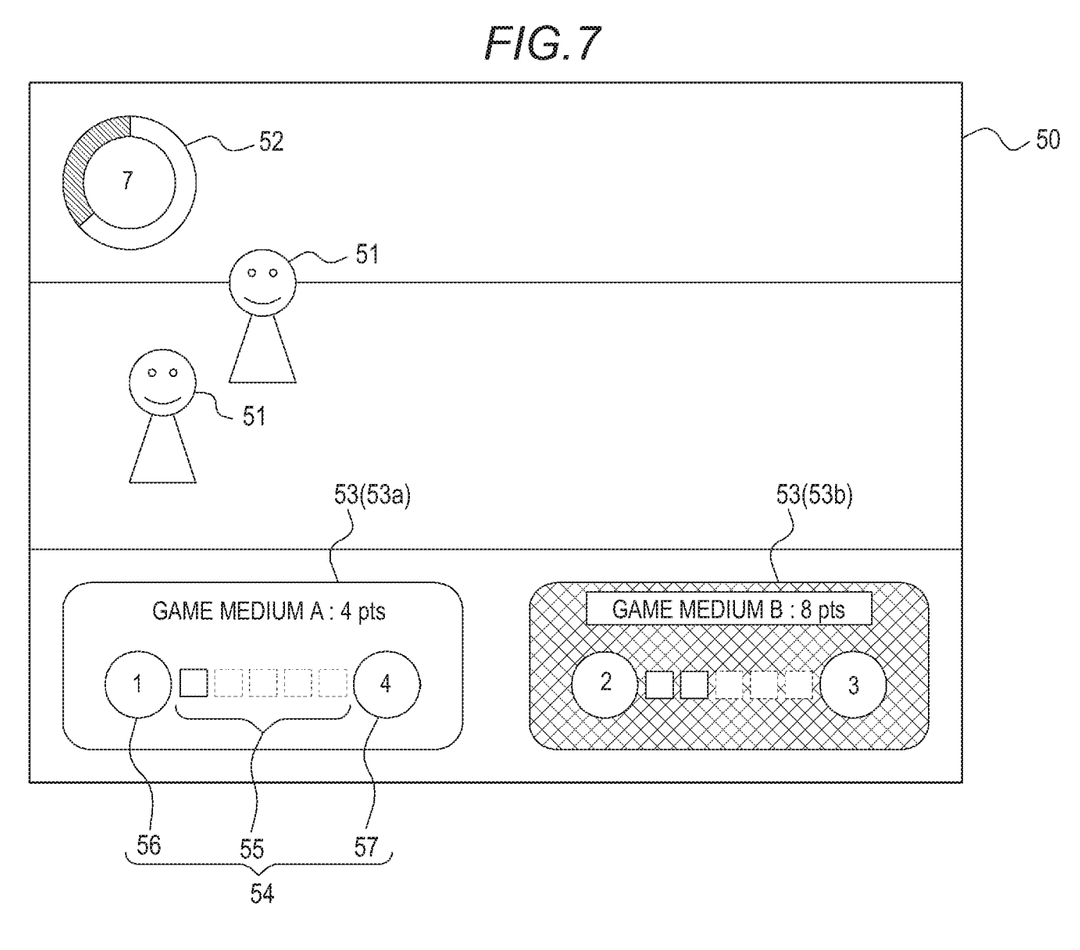
FIG. 7 is an exemplary embodiment of a view illustrating a third example of the screen that is displayed on the terminal device.

Description may be given of a screen 50 that may be displayed on the display unit 23 of the terminal device 20 during execution of the game part according to another embodiment with reference to FIG. 7.

Two game media 51, an action point 52, and two action selection buttons 53 (53a and 53b) may be displayed on the screen 50. The game media 51 may be game media which appear in a virtual space.

The terminal control unit 25 may increase the action point value 52 of a player that may be a user of the terminal device 20 with the elapse of an in-game time. For example, the terminal control unit 25 may increase the action point value of the player by one point whenever a predetermined system time or a predetermined number of frames has elapsed. In the example illustrated in FIG. 7, the action point value 52 may be 7 points.

A game content, an action that may be executed by the game content, and a cost value of the action may be correlated with each of the action selection buttons 53. For example, an action corresponding to the action selection button 53 may be "appearance". When the game content may execute "appearance", the game content appears in a virtual space. A cost value corresponding to the action of "appearance" may be different between game media. Two or more action selection buttons 53 which respectively correspond to two or more game media may be displayed on the screen 50. For example, in the example illustrated in FIG. 7, a game content A, and a cost value of 4 points corresponding to the action of "appearance" may be correlated with the action selection button 53a. A game content B, and a cost value of 8 points corresponding to the action of "appearance" may be correlated with the action selection button 53b. For example, the action selection button 53 may include an image of a card indicating a corresponding game content.

The action selection button 53 may be a GUI that accepts a user operation that may execute action processing of a player. In this game part, the action processing of the player may include processing of allowing a corresponding game content to appear in a virtual space. When accepting a user operation with respect to the action selection button 53, the terminal control unit 25 decreases the following total cost from the player's action points 52, and allows a corresponding game content to appear in the virtual space. The terminal control unit 25 may automatically control the action of the game content that appears in the virtual space.

A parameter operation region 54 may be provided for each of the action selection buttons 53. For example, as illustrated in FIG. 7, the parameter operation region 54 may be provided on the action selection button 53 or may be provided to be spaced away from the action selection button 53. An interface 55, a first parameter 56, and a second parameter 57 may be displayed in the parameter operation region 54. The interface 55 may be a GUI that accepts a user operation of causing the first parameter 56 and the second parameter 57 to fluctuate. In the example illustrated in FIG. 7, the interface 55 may include five frames (for example, check boxes) provided in a manner capable of being respectively selected in correspondence with a user operation. The terminal control unit 25 may determine the first parameter 56 to the number of frames which may be in selection, and may determine the second parameter 57 to the number of frames which may be in non-selection. In FIG. 7, a frame in selection may be indicated by a solid line, and a frame in non-selection may be indicated by a broken line. In the example illustrated in FIG. 7, the first parameter 56 may be 1 point, and the second parameter 57 may be 4 points. The terminal control unit 25 may calculate a cost value corresponding to the first parameter 56. For example, as the first parameter 47 may be greater, the cost value may be set to be larger. For example, the first parameter 56 and the cost value corresponding to the first parameter 56 may be the same value. The terminal control unit 25 may accept the user operation with respect to the interface 55 in the action selection button 53 at an arbitrary timing.

Hereinafter, a total value of the cost value corresponding to the action of "appearance" and the cost value corresponding to the first parameter 56 in the action selection button 53 may also be referred to as a total cost corresponding to the action selection button 53.

In this game part, the action opportunity may be given to a player for every game content corresponding to the action selection button 53. Specifically, when the action point 52 that may increase with the elapse of the in-game time reaches the total cost corresponding to the action selection button 53, the terminal control unit 25 may allow a user operation with respect to the action selection button 53 to be accepted. When the user operation with respect to the action selection button 53 is allowed to be accepted, the terminal control unit 25 may provide an action opportunity with respect to a game content corresponding to the action selection button 53 to a player.

In a case where the total cost corresponding to the action selection button 53 may be greater than the action point 52, the terminal control unit 25 may display the action selection button 53 in a display aspect different from a typical display aspect, and may stop acceptance of the user operation with respect to the action selection button 53. For example, a total cost corresponding to the action selection button 53b illustrated in FIG. 7 may be a total value (10 points) of a cost value (8 points) corresponding to the action of "appearance" and a cost value (for example, 2 points) corresponding to the first parameter, and may be greater than the action point value 52 (7 points). In this case, the terminal control unit 25 may display the action selection button 53b, for example, in a darker state in comparison to a typical case.

For example, when a user operation with respect to the action selection button 53a illustrated in FIG. 7 is accepted, the terminal control unit 25 may allow the game content A to appear in the virtual space by consuming the action points 52 (7 points) by a total value (5 points) of a cost value (4 points) corresponding to the action of "appearance" and a cost value (for example, 1 point) corresponding to the first parameter 56, and may cause a game effect of making a player closer to an advantageous or disadvantageous situation to occur on the basis of the second parameter (4 points). For example, the game effect may include an effect of increasing or decreasing soundness of the game content A that may be allowed to appear in the virtual space.

After execution of action processing of a player corresponding to the game content A, when an action opportunity corresponding to the game content A is given again to the player, the terminal control unit 25 may execute processing based on the first parameter (1 point) that may be determined in an immediately previous action opportunity. Here, the "immediately previous action opportunity" may be an immediately previous action opportunity among action opportunities given to the player with respect to the game content A, or an immediately previous action opportunity among action opportunities given to the player regardless of the kind of game media. For example, the processing may include processing of increasing the action point value 52 by the first parameter (1 point), or processing of reducing the cost value (4 points) corresponding to the action of "appearance" that may be executed by the game content A by the first parameter (1 point). According to the above-described configuration, in an immediately previous action opportunity, the player can consume the action points 52 in surplus by the cost value corresponding to the first parameter. On the other hand, in the subsequent action opportunity, the action points 52 may increase or the cost value corresponding to the action of "appearance" that may be executed by the game content A decreases by the first parameter determined in the previous action opportunity. Accordingly, a part of a burden on execution of action processing in the subsequent action opportunity may be taken over in an immediately before action opportunity. Accordingly, the strategic characteristic of a game may be improved.

Figure 8:
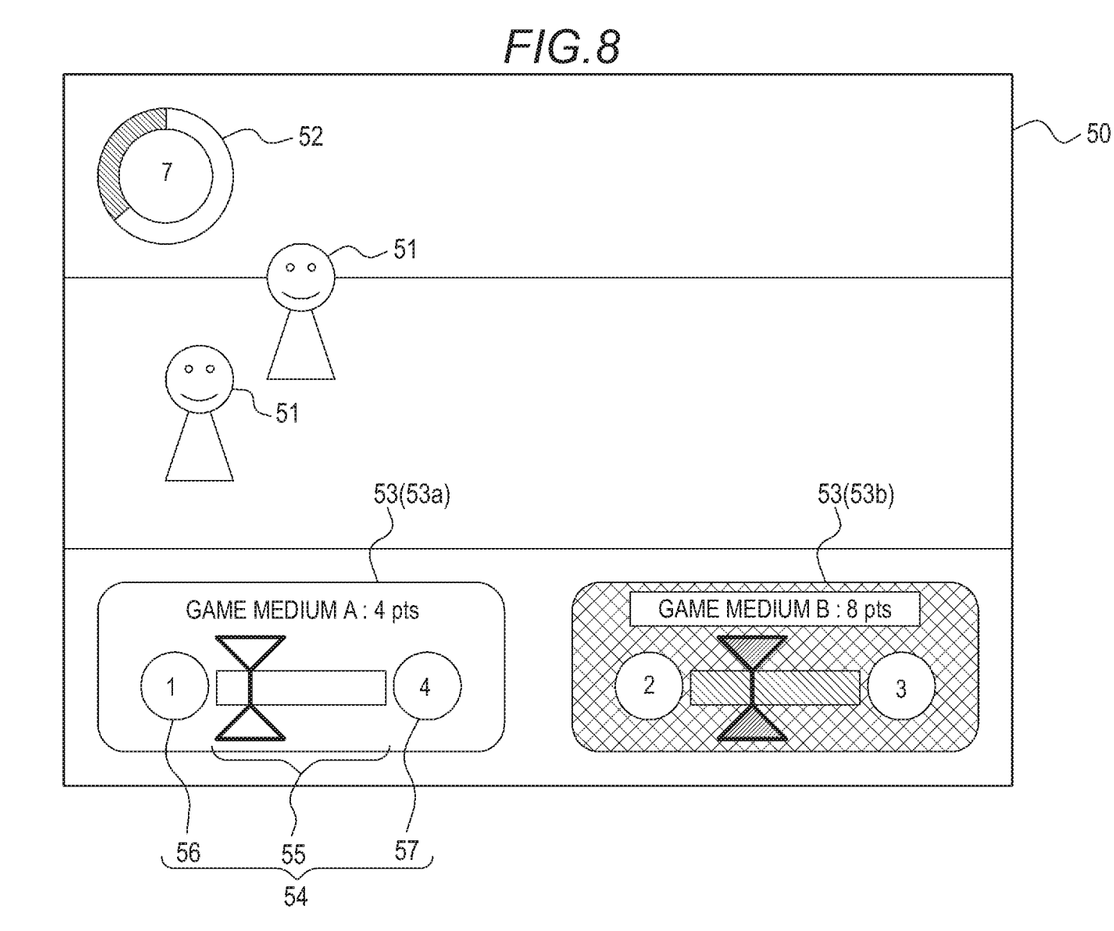
FIG. 8 is an exemplary embodiment of a view illustrating a fourth example of the screen that is displayed on the terminal device.

Here, a specific aspect of the interface 55 may not be limited to the above-described example. For example, in an example illustrated in FIG. 8, the interface 55 may include a slider that can move in a one-dimensional direction. For example, the terminal control unit 25 may determine the first parameter 56 and the second parameter 57 in correspondence with a position of the slider.

in the above-described embodiment, at least a part of the screens displayed on the terminal device 20 may be set as a web display in which display may be performed on the terminal device 20 on the basis of data generated by the server device 10, and at least a part of the screens may be set as a native display in which display may be performed by a native application installed in the terminal device 20. As described above, the game according to the above-described embodiment may be set as a hybrid game in which the server device 10 and the terminal device 20 partially take charge of the processing of the game.

In addition, an information processing device such as a computer and a portable telephone may be appropriately used to function as the server device 10 or the terminal device 20 according to the above-described embodiment. The information processing device can be realized by storing a program, which describes processing certain subject matter for realization of respective functions of the server device 10 or the terminal device 20 according to this embodiment, in a storage unit of the information processing device, and by reading out and executing the program by a CPU of the information processing device.

What is claimed is:

1. A non-transitory computer-readable medium embodying program code that, when executed, causes an information processing device to execute:
   a step of initiating a game part for one or more terminal devices, the one or more terminal devices associated with one or more user IDs;
   a step of identifying, in the game part, for each terminal device in the one or more terminal devices, an action opportunity, said action opportunity comprising a period in which action processing may be received and processed for said terminal device, and providing the action opportunity to each terminal device;
   a determination step of determining a first parameter and a second parameter for a game content of a video game, so that a total value of the first parameter and the second parameter which are correlated with a specific user ID in the one or more user IDs becomes constant at a predetermined value when the action opportunity is given to a terminal device associated with the specific user ID;

wherein the determination step comprises providing, on a display of the terminal device associated with the specific user ID, a selection interface comprising a parameter operation region, the parameter operation region configured to receive a selection of the first parameter and the second parameter from the terminal device associated with the specific user ID while maintaining the total value of the first parameter and the second parameter constant; and a step of executing action processing associated with the specific user ID based on the selection of the first parameter and the second parameter provided from the terminal device associated with the specific user ID, wherein the first parameter is used in processing when a subsequent action opportunity is given to the terminal device associated with the specific user ID, and the second parameter is used in processing before the subsequent action opportunity is given to the terminal device associated with the specific user ID;

wherein the game content comprises at least one of: a character, an avatar, and a card, said card associated with another game content and providing an action processing interface element displayed thereupon, said card further configured to produce a game effect as the action processing based on the selection of the first parameter and the second parameter from the terminal device associated with the specific user ID.

2. The non-transitory computer-readable medium according to claim 1, further causing the information processing device to execute:

a step of increasing a point value that is correlated with the specific player on the basis of the first parameter that is determined in a previous action opportunity of the specific player when the action opportunity is given to the specific player, wherein the action processing of the specific player is executed in correspondence with consumption of the point value that is correlated with the specific player.

3. The non-transitory computer-readable medium according to claim 2, wherein in the determination step, the first parameter and the second parameter which are correlated with the specific player fluctuate in correspondence with consumption of the point value that is correlated with the specific player.

4. The non-transitory computer-readable medium according to claim 1, further causing the information processing device to execute:

a step of causing a game effect of making a first player close to an advantageous or disadvantageous situation, on the basis of the second parameter correlated with the first player, to occur over at least a part of a period until the subsequent action opportunity is given to the first player after the second parameter is determined in an action opportunity of the first player.

5. The non-transitory computer-readable medium according to claim 4, wherein the game effect includes an effect of causing a third parameter correlated with the first player or a second player to fluctuate on the basis of the second parameter that is correlated with the first player, and wherein a fluctuation amount of the third parameter that fluctuates due to the game effect varies in correspondence with the second parameter that is correlated with the first player.

6. The non-transitory computer-readable medium according to claim 4, further causing the information processing device to execute:

a step of causing a third parameter correlated with the first player or a second player to fluctuate in correspondence with occurrence of a predetermined event, wherein the game effect includes an effect of increasing or decreasing a fluctuation amount when the third parameter is caused to fluctuate in correspondence with occurrence of the event, and wherein an increase value or a decrease value of the fluctuation amount that increases or decreases due to the game effect varies in correspondence with the second parameter that is correlated with the first player.

7. An information processing device, comprising:

a control unit, wherein the control unit, initiates a game part provided across one or more terminal devices, the one or more terminal devices associated with one or more user IDs, identifying, in the game part, for each terminal device in the one or more terminal devices, an action opportunity, said action opportunity comprising a period in which action processing may be received and processed for said terminal device, and providing the action opportunity to each terminal device, determines a first parameter and a second parameter for a game content of a video game, so that a total value of the first parameter and the second parameter which are correlated with a specific user ID in the one or more user IDs becomes constant at a predetermined value when the action opportunity is given to a terminal device associated with the specific user ID, provides, to the specific player, on a display of the terminal device associated with the specific user ID, a selection interface comprising a parameter operation region, the parameter operation region configured to receive a selection of the first parameter and the second parameter from the terminal device associated with the specific user ID while maintaining the total value of the first parameter and the second parameter constant; and executes action processing associated with the specific user ID based on the selection of the first parameter and the second parameter provided from the terminal device associated with the specific user ID, the first parameter is used in processing when a subsequent action opportunity is given to the terminal device associated with the specific user ID, and the second parameter is used in processing before the subsequent action opportunity is given to the terminal device associated with the specific user ID, wherein the game content comprises at least one of: a character, an avatar, and a card, said card associated with another game content and providing an action processing interface element displayed thereupon, said card further configured to produce a game effect as the action processing based on the selection of the first parameter and the second parameter from the terminal device associated with the specific user ID.

8. A control method of an information processing device, the method comprising:

a step of initiating a game part for one or more terminal devices, the one or more terminal devices associated with one or more user IDs;

a step of identifying, in the game part, for each terminal device in the one or more terminal devices, an action opportunity, said action opportunity comprising a period in which action processing may be received and processed for said terminal device, and providing the action opportunity to each terminal device;

a determination step of determining a first parameter and a second parameter for a game content of a video game, so that a total value of the first parameter and the second parameter which are correlated with a specific user ID in the one or more user IDs becomes constant at a predetermined value when the action opportunity is given to a terminal device associated with the specific user ID;

wherein the determination step comprises providing, on a display of the terminal device associated with the specific user ID, a selection interface comprising a parameter operation region, the parameter operation region configured to receive a selection of the first parameter and the second parameter from the terminal device associated with the specific user ID while maintaining the total value of the first parameter and the second parameter constant; and a step of executing action processing associated with the specific user ID based on the selection of the first parameter and the second parameter provided from the terminal device associated with the specific user ID, wherein the first parameter is used in processing when a subsequent action opportunity is given to the terminal device associated with the specific user ID, and the second parameter is used in processing before the subsequent action opportunity is given to the terminal device associated with the specific user ID, wherein the game content comprises at least one of: a character, an avatar, and a card, said card associated with another game content and providing an action processing interface element displayed thereupon, said card further configured to produce a game effect as the action processing based on the selection of the first parameter and the second parameter from the terminal device associated with the specific user ID.

* * * * *